US011810372B2

(12) United States Patent
Balch et al.

(10) Patent No.: US 11,810,372 B2
(45) Date of Patent: *Nov. 7, 2023

(54) MULTIPLE IN-CABIN CAMERAS AND LIGHTING SOURCES FOR DRIVER MONITORING

(71) Applicant: TOYOTA JIDOSHA KABUSHIKI KAISHA, Toyota (JP)

(72) Inventors: Thomas Balch, Somerville, MA (US); Simon A. I. Stent, Cambridge, MA (US); Guy Rosman, Newton, MA (US); John Gideon, Los Altos, CA (US)

(73) Assignee: TOYOTA JIDOSHA KABUSHIKI, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,046

(22) Filed: Nov. 22, 2022

(65) Prior Publication Data

US 2023/0090330 A1 Mar. 23, 2023

Related U.S. Application Data

(63) Continuation of application No. 17/074,733, filed on Oct. 20, 2020, now Pat. No. 11,527,081.

(51) Int. Cl.
 *G06V 20/59* (2022.01)
 *B60W 40/08* (2012.01)

(52) U.S. Cl.
 CPC ............ *G06V 20/593* (2022.01); *B60W 40/08* (2013.01); *G06V 20/597* (2022.01); *B60W 2040/0881* (2013.01)

(58) Field of Classification Search
 None
 See application file for complete search history.

(56) References Cited

U.S. PATENT DOCUMENTS

| | | |
|---|---|---|
| 6,952,498 B2 | 10/2005 | Ishikura |
| 9,472,023 B2 | 10/2016 | Sisbot et al. |
| 9,688,281 B2 | 6/2017 | Parundekar |
| 10,043,074 B2 | 8/2018 | Hilsebecher et al. |
| 10,262,211 B2 | 4/2019 | Govindasamy |
| 2006/0018641 A1* | 1/2006 | Goto ..................... B60R 25/302 396/4 |

(Continued)

FOREIGN PATENT DOCUMENTS

JP 2007-15663 A 1/2007

*Primary Examiner* — Thomas S McCormack
(74) *Attorney, Agent, or Firm* — Oblon, McClelland, Maier & Neustadt, L.L.P.

(57) ABSTRACT

A control system, computer-readable storage medium and method of preventing occlusion of and minimizing shadows on the driver's face for driver monitoring. The system includes a steering wheel, a plurality of fiberscopes arranged evenly spaced around the steering wheel, and one or more video cameras arranged at remote ends of the plurality of fiberscopes. Distal ends of the fiberscopes emerge to a surface of the steering wheel through holes that are perpendicular to an axis of rotation of the steering wheel. Each of the distal ends of the fiberscopes includes a lens. The system includes a plurality of light sources and an electronic control unit connected to the one or more video cameras and the light sources.

15 Claims, 8 Drawing Sheets

(56) References Cited

U.S. PATENT DOCUMENTS

| | | |
|---|---|---|
| 2010/0002075 A1 | 1/2010 | Jung et al. |
| 2016/0185354 A1* | 6/2016 | Lisseman et al. |
| 2017/0046582 A1* | 2/2017 | Hoshiya ............... B60Q 3/283 |
| 2017/0291493 A1 | 10/2017 | Bostick |
| 2019/0054954 A1 | 2/2019 | Clochard |
| 2019/0180126 A1 | 6/2019 | Kinoshita et al. |
| 2019/0188506 A1 | 6/2019 | Siboni et al. |
| 2019/0266743 A1 | 8/2019 | Matsuura |
| 2021/0293534 A1 | 9/2021 | Muller |

* cited by examiner

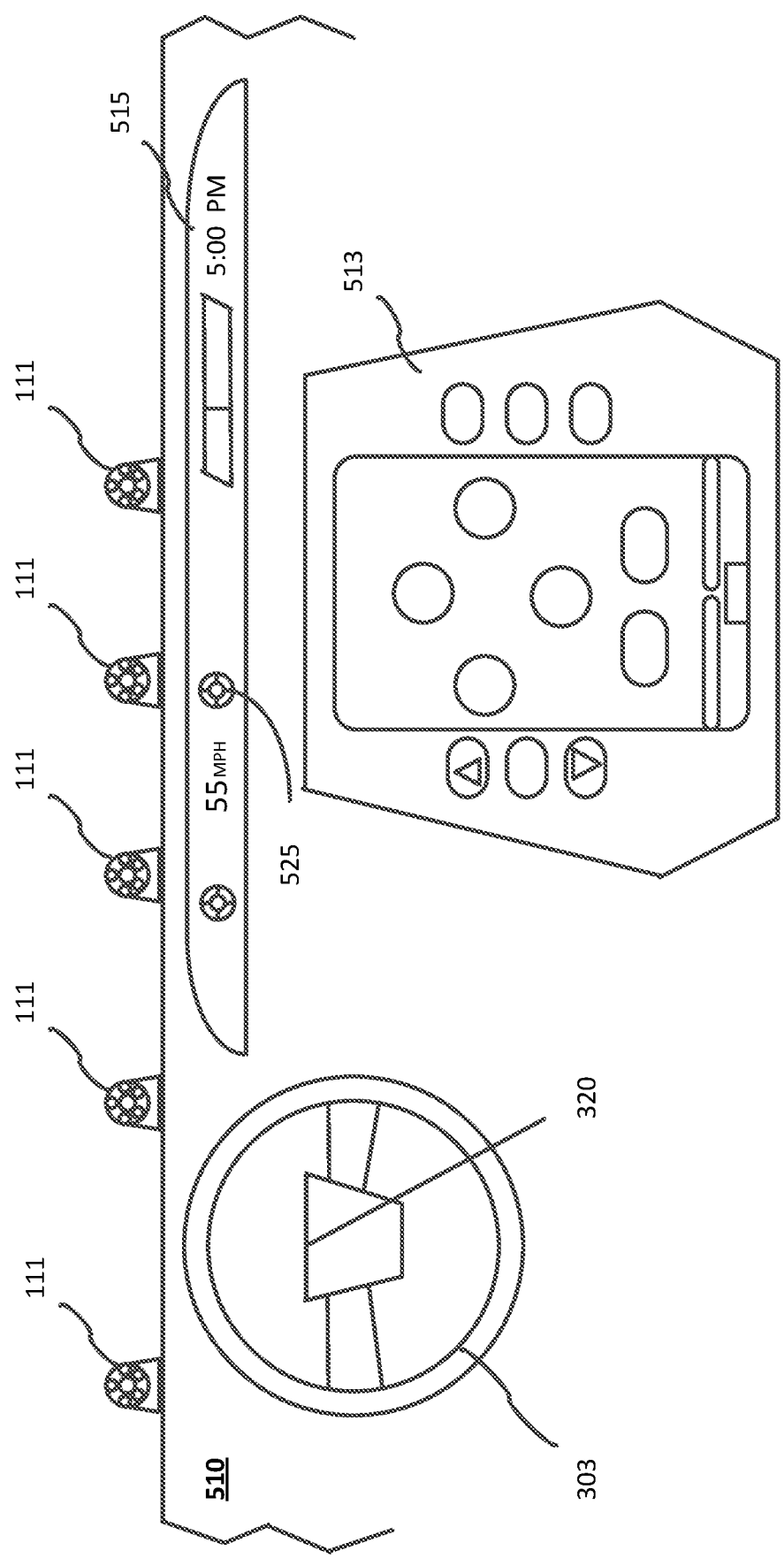

MULTIPLE IN-CABIN CAMERAS AND LIGHTING SOURCES FOR DRIVER MONITORING

CROSS-REFERENCE TO RELATED APPLICATIONS

This application is a continuation application of U.S. application Ser. No. 17/074,733, filed Oct. 20, 2020, the entire contents of which are incorporated herein by reference.

BACKGROUND

Technical Field

The present disclosure is directed to a driver monitoring system that continuously has a view of a driver's face and includes lighting sources at various locations in the vehicle cabin so that the driver's face is never occluded and so that the shadows can be eliminated.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Vehicle-based systems have been proposed that include multiple cameras within the cabin of a vehicle and configured to provide multiple vantage points (multiple angles) so that a driver's face is visible to a driver monitoring system. US 2019/0188506 to Siboni et al. describes a vehicle-mounted display system for enhancing a driver's forward viewability, which includes 2-D or 3-D cameras that may be directed to the face of the driver at different angles. A processing unit acquires the images captured by each of the cameras and analyzes the acquired image data to provide an estimation as to which direction the driver is looking at any time.

US 2019/0180126 to Kinoshita et al. describes an apparatus for determining the state of a driver driving a vehicle. Cameras are placed to capture images of the face of the driver from different positions. These cameras may each be installed, for example, on the dashboard, at the center of the steering wheel, beside the speed meter, or on a front pillar. An image selection unit can select, from multiple monitoring images each containing the face, one eye, or two eyes, one monitoring image capturing the driver with the face oriented closest to the front.

In some systems, multiple light sources are positioned to ensure that shadows in a driver's face can be eliminated. US 2017/0046582 to Hoshiya describes a driver monitor device that includes multiple light sources for irradiating light toward a driver seat respectively; a shooting unit arranged at a position from which the shooting unit shoots a picture of a driver sitting on the driver seat; a driver detection unit detecting a position of a face or an eye of the driver based on information in an image shot by the shooting unit; a light source specifying unit specifying one of the light sources which irradiates an area of the face or the eye of the driver, according to a detection result of the driver detection unit; and a light source control unit controlling the light sources to turn on the one of the light sources specified by the light source specifying unit, and to turn off or dim another light source.

In some systems a camera is arranged such that eyes of the driver are visible and tracked. In some systems data from multiple cameras may be fused into one image.

However, there is a need for a system and method that minimizes power usage, computational complexity, and memory footprint by preventing occlusion of and eliminating shadows on the driver's face.

An aspect is a system having multiple low resolution cameras which are disposed at ends of fiber optic tubes that surround the driver. At least some of the low resolution cameras may be located in the steering wheel or steering wheel column, and only those cameras or fiber optic tubes located at the top of the steering wheel may be turned on as the position of the wheel changes. The number of cameras turned on is minimized and images from multiple cameras may be combined to further minimize memory footprint.

SUMMARY

An aspect is a control system for preventing occlusion of and minimizing shadows on a driver's face for driver monitoring. The system including a vehicle dashboard; a plurality of in-cabin cameras mounted to the vehicle dashboard; a plurality of light sources positioned adjacent to the in-cabin cameras; and an electronic control unit connected to the plurality of in-cabin cameras and the plurality of light sources to turn on selected ones of the plurality of light sources based on an amount of shading in an image of the driver's face.

An aspect is a method of preventing occlusion of and minimizing shadows on a driver's face for driver monitoring in a driver monitoring system, the driver monitoring system includes a vehicle dashboard, a plurality of in-cabin cameras mounted to the vehicle dashboard, a plurality of light sources positioned adjacent to the in-cabin cameras, and an electronic control unit (ECU) connected to the plurality of in-cabin cameras and the plurality of light sources. The method including upon detecting movement of a drivers head beyond a predetermined angle, the electronic control unit turning on one or more of the plurality of in-cabin cameras, while turning off others of the plurality of in-cabin cameras, and turning on selected ones of the plurality of light sources based on an amount of shading in an image of the driver's face.

An aspect is a non-transitory computer readable storage medium storing program instructions, which when executed by a computer perform method of preventing occlusion of and minimizing shadows on the driver's face for driver monitoring including upon detecting movement of the driver's head beyond a predetermined angle, turning on one or more in-cabin cameras, while turning off others of in-cabin cameras, and turning on selected ones of a plurality of in-cabin light sources based on an amount of shading in an image of the driver's face.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5 illustrates sensor and displays for an interior of a vehicle in accordance with an exemplary aspect of the disclosure;

DETAILED DESCRIPTION

Figure 1:
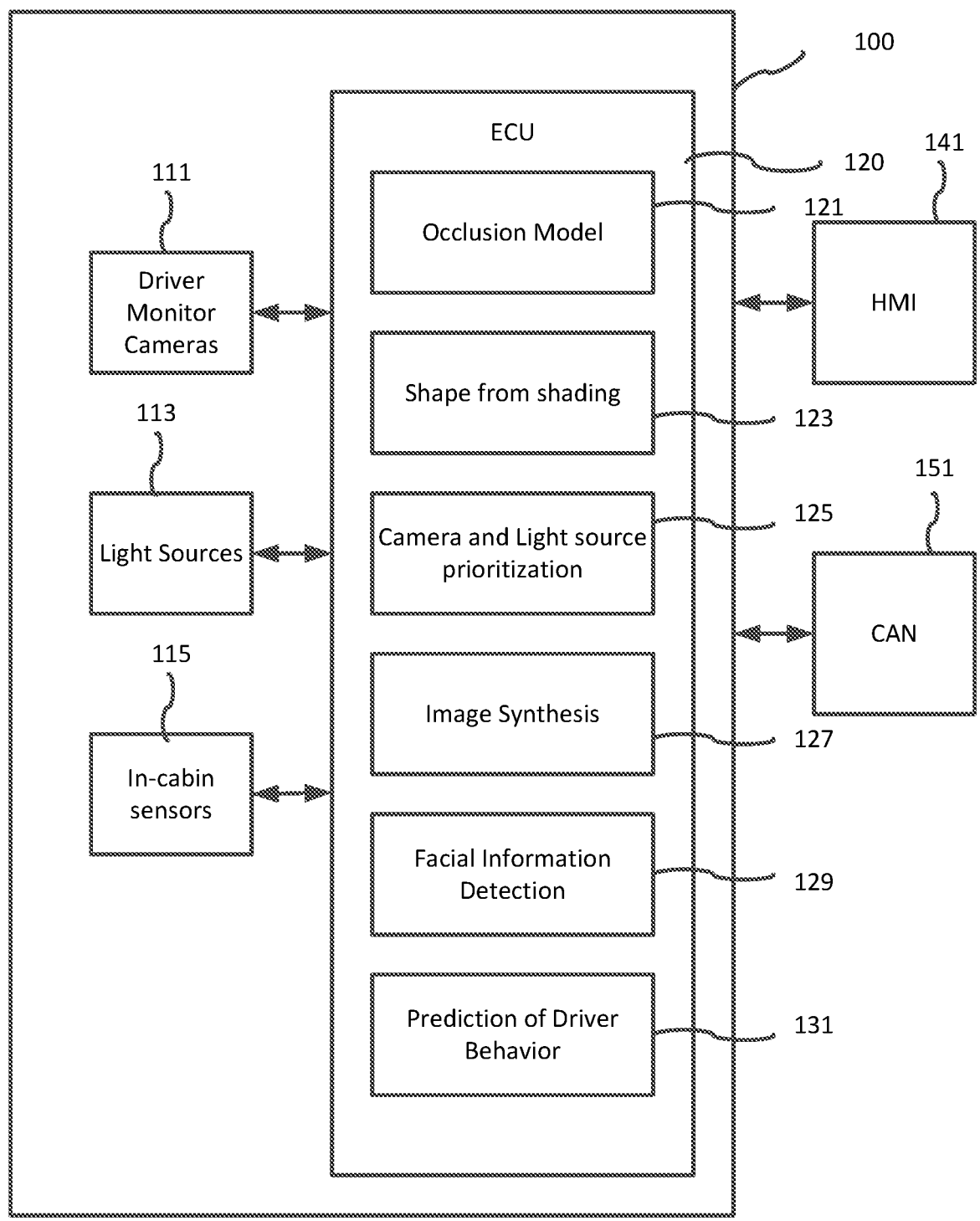
FIG. 1 is a block diagram of a driver monitoring system in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

It has been said that machine learning methods, in particular deep learning, may be capable of detecting details in images even of poor quality, such as images that are shaded, glaring, or blurry. However, to make deep learning possible, the system needs to have access to very large amounts of data. In addition, training is typically performed off-line by supplying large numbers of example images as training data, while providing labels for what each image portrays. Furthermore, machine learning, and in particular deep learning, within a vehicle typically is performed using a relatively expensive System on Chip (SOC), which is capable of performing specialized operations for artificial neural networks.

Other approaches for performing computer vision may be implemented using conventional central processing unit (CPU) cores and/or digital signal processing (DSP) devices. The other approaches make use of sharp edges and contrast in images, and subsequently may not work well for images that have shading, blurriness, and glare. Disclosed embodiments seek to provide images of high quality so that they can be processed using conventional computer vision techniques and with minimal computer hardware requirements. Disclosed embodiments may be implemented with low resolution video cameras.

FIG. 1 is a block diagram of a driver monitoring system in accordance with an exemplary aspect of the disclosure. A driver monitoring system 100 is mounted in a vehicle and monitors the state of the driver of the vehicle. The driver monitoring system 100 may be equipped with driver monitor cameras 111 configured with a sufficient number of viewpoints to generate a 3D model of a driver's face. The driver monitor cameras 111 may be low resolution video cameras (in a range of 8 megapixels or lower), and preferably have an image sampling rate that is sufficient to detect motion of an eye (e.g., a sampling rate of at least 30 Hz, but preferably 90 Hz and higher).

A driver monitor camera 111 may be provided as a combination of a camera and light projector. For example, the camera may be a CMOS (complementary metal oxide semiconductor) camera or CCD (charge coupled device) camera, while the projector may be an LED (light emitting diode). Further, in order to enable the face of the driver to be captured without making the driver uncomfortable even during other low luminance time such as night, shaded or cloudy environment conditions, in some embodiments the projector may be a near-infrared LED. For example, the projector may include two near-infrared LEDs arranged on opposite sides of the camera. The projector may include LEDs evenly spaced in a circular arrangement around a camera. Further, a camera may be provided with a filter, for example a visible light cutting filter. The facial image of the driver generated by the driver monitor camera 111 is transmitted from the driver monitor camera 111 to an electronic control unit (ECU) 120.

The driver monitoring system 100 may be equipped with other light sources 113 to provide additional lighting for the driver monitor cameras 111. The other light sources 113 may also be light emitting diodes (LEDs) to emit visible light or near-infrared light.

The driver monitoring system 100 may be equipped with other in-cabin sensors 115 including, but not limited to, heart rate sensors, contactless temperature sensors, radar.

The driver monitoring system 100 is equipped with an ECU 120. The ECU 120 may be a microcomputer or microcontroller. Although FIG. 1 shows the ECU as a single device, multiple ECUs 120 may be provided for different functions. Also, multiple ECUs 120 may be interconnected in a network. The ECU 120 may perform functions including an occlusion model function 121, a shape from shading function 123, a camera and light source prioritization 125, an image synthesis function 127, facial information detection 129, and a driver state prediction function 131.

The driver monitoring system 100 may emit a visual or audio alarm to the driver through a human-machine interface (HMI) 141. The HMI 141 may include a display for displaying text or image information, a speaker for generating sound, operating buttons for the driver to perform an entry operation, as well as a touch panel and/or microphone. The driver monitoring system 100 may send commands to actuators, in some cases having dedicated microcontrollers, to perform actions by the vehicle, such as control of braking or steering. Communication of commands and intercommunication between microcontrollers is typically performed using a controller area network (CAN) 151. As is known in the art, a controller area network, or CAN for short, interconnects microcontrollers and actuator devices and allows communication with each other's applications by way of messages.

The occlusion model function 121 performs a function of determining the extent that facial features of the driver are occluded when the driver's face moves to the extent that at least some portion of facial features are out of view of a particular camera or cameras 111. A driver's face may be occluded when the driver turns their head a certain way that is not facing a camera or cameras 111 of the driver monitoring system 100. The occlusion model 121 may include a face recognition component that can detect that a driver's face is not facing a forward facing direction, and may identify the direction that the driver's head is facing. The face recognition component utilize facial features detected by a facial information detection function 129, such as position and visibility of one or both ears, position of a nose, eyes and mouth in order to determine a direction that the driver's head is facing. The occlusion model 121 may identify that the driver's head is facing to the right or to the left relative to a forward facing direction. The forward facing direction of a driver's face may be a direction in which the driver's eyes are focusing in a direction toward the front of the vehicle that the driver is driving. In some embodiments, the forward direction is a direction toward the center of a furthest visible forward point of the vehicle.

The shape from shading function 123 is configured to detect the effect of lighting, which may be used to determine which light sources 113 to use. Shading is a variation in brightness that depends on the shape of the driver's face, as well as other properties including reflectance of the surface of the face and the distribution of light sources. The function 123 may record a brightness pattern of an image, which is affected by the shape of the face. A reflectance map captures the dependence of brightness on surface orientation. Using a process of photometric stereo, two images taken from the same viewpoint, with different lighting, can be used to determine face surface orientation. A more accurate surface orientation may be obtained using three or more images (i.e., three or more lighting conditions) for the same viewpoint. Alternatively, shape from shading recovers surface shape from a single image. In the shape from shading process, shape is obtained from shading using a known reflectivity function and the position of the light sources.

It has been found that subjects may be biased in the illumination direction. Thus, choice in location of light sources may affect the quality of shape from shading. As an example, provided a light source that illuminates from an angle toward the left side of a person's face and a camera for capturing an image from an angle toward a right side of a person's face, areas of the right side of the person's face may not receive sufficient light to discern a shape of the right side of the face.

Information obtained from the occlusion model function 121 may be used in determining which driver monitor cameras 111 to operate. Information obtained from the shape from shading function 123 may be used in determining which light sources 113 to operate and to what extent. In addition, the occlusion model function 121 may be configured to predict the driver's face orientation based on head movement and other factors such as the trajectory of the vehicle and a trajectory path as obtained from a navigation function of the vehicle. Subsets of the cameras 111 and light sources 113 may be selected based on the predicted driver's face orientation.

The camera and light source prioritization function 125 may prioritize the cameras 111 and light sources 113 that are to be used to capture images of a driver's face. The camera and light source prioritization function 125 may include a next best view planning component. The next best view planning component may use predicted orientations of a driver's face to schedule cameras 111 and lighting sources 113 to operate. As will be described below, the subsets of cameras and light sources may be chosen from among cameras and light sources located in the vehicle cabin, on the vehicle dash, and on the steering wheel.

For cameras located on the steering wheel, the camera and light source prioritization function 125 may include a sensor that checks for movement of the steering wheel and/or an angle of the steering wheel from a neutral position. The neutral position of the steering wheel may be the position of the steering wheel when the wheels are facing forward. The sensor for checking movement of the steering wheel may be an angular position sensor to measure angular position changes relative to the neutral position.

The image synthesis function 127 may combine images from multiple cameras 111. The images may be combined to form a single non-overlapping image, or stereographic images may be used to generate a 3D image.

The facial information detection function 129 detects features of a driver's face, including the nose, eyes, mouth, ears. Images captured by a prioritized set of cameras may be provided to the facial information detection function 129 and analyzed to recognize the nose, eyes, mouth, that may be used for further analysis of driver behavior.

The driver behavior detection function 131 may use a synthesized image or 3D image from the image synthesis function 127 and facial information from the facial information detection function 129, as well as information obtained from other in-cabin sensors 115, to determine a state of the driver. For example, the driver behavior detection function 131 may detect whether a driver is drowsy or is otherwise distracted.

Figure 2:
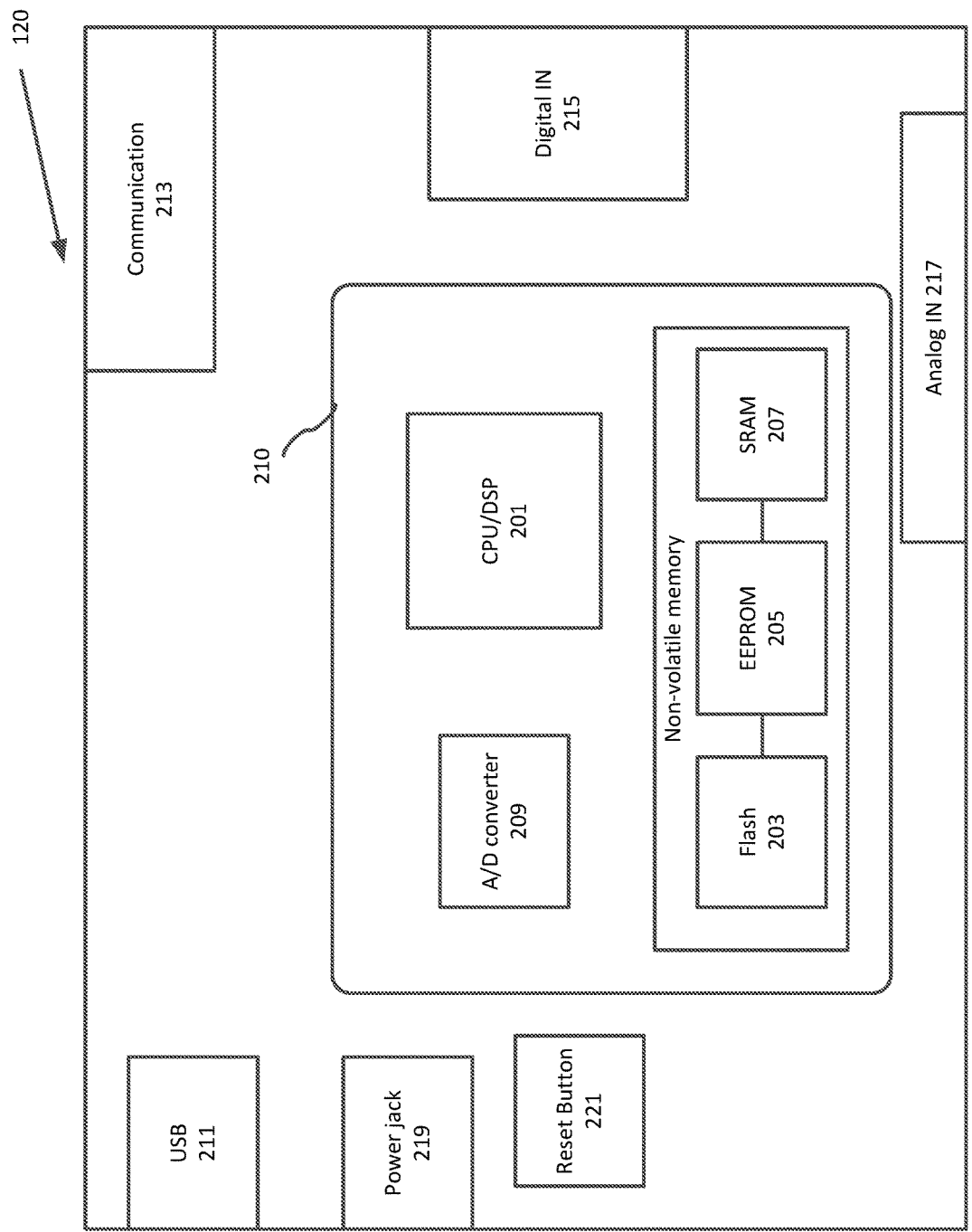
FIG. 2 is a block diagram of an electronic control unit in accordance with an exemplary aspect of the disclosure.

FIG. 2 is a block diagram of an electronic control unit in accordance with an exemplary aspect of the disclosure. The computer-based control system 120 may be based on a microcontroller. A microcontroller may contain one or more processor cores (CPUs and/or DSPs) along with memory (volatile and non-volatile) and programmable input/output peripherals. Program memory in the form of flash, ROM, EPROM, or EEPROM is often included on chip, as well as a secondary RAM for data storage. The board includes digital I/O pins 215, analog inputs 217, hardware serial ports 213, a USB connection 211, a power jack 219, and a reset button 221. It should be understood that other microcontroller configurations are possible. Variations can include the number of pins, whether or not the board includes communication ports or a reset button.

The microcontroller may be a RISC-based microcontroller having flash memory 203, SRAM 207, EEPROM 205, general purpose I/O lines, general purpose registers, a real time counter, six flexible timer/counters, an A/D converter 209, and a JTAG interface for on-chip debugging. Microcontrollers vary based on the number of processing cores, size of non-volatile memory, the size of data memory, as well as whether or not it includes an A/D converter or D/A converter.

Figure 3:
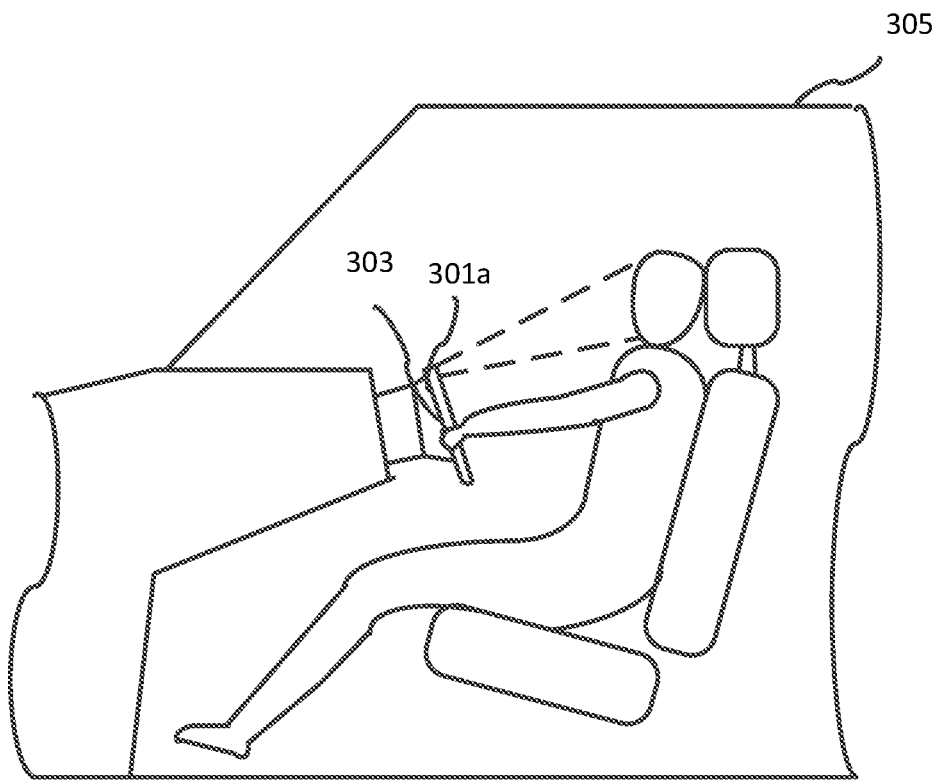
FIG. 3 is a schematic illustrating a vehicle cabin interior having components of the driver monitoring system in accordance with an exemplary aspect of the disclosure.

FIG. 3 is a schematic illustrating a vehicle cabin interior having components of the driver condition detection system in accordance with an exemplary aspect of the disclosure. At least some driver monitor cameras 301 are mounted along the rim of the steering wheel 303. While in operation, a selected group of monitor cameras 301*a* will perform image capturing. As will be discussed below, other video cameras may be located in various positions in the passenger cabin 305.

Figure 4A:
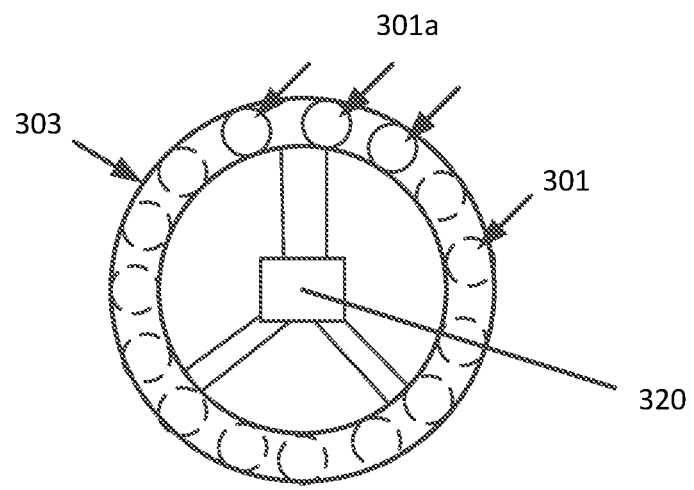
FIGS. 4A and 4B are schematic diagrams illustrating fiberscopes as interior cameras in accordance with an exemplary aspect of the disclosure.

FIG. 4A is a schematic diagram illustrating fiberscopes as driver monitor cameras in accordance with an exemplary aspect of the disclosure. In order to accommodate cameras in the limited space of a steering wheel 303, driver monitor cameras 301 may be positioned at the end of fiberscopes, in which distal ends of the fiberscopes are located on the steering wheel while the video cameras are positioned in remote locations from the steering wheel. In some embodiments, video cameras may be mounted inside the steering column 320, or behind the vehicle dash. In general, a fiberscope is an optical fiber bundle with an eyepiece on one end and a lens on the other that is typically used to reach difficult to reach places. A typical optical fiber bundle may be inserted into a hole of 0.6 mm or larger. The eyepiece may be a camera or may be a combination eyepiece lens and camera.

In place of cameras 301 arranged in a steering wheel 303, distal ends 311 of fiberscopes may be evenly spaced in a steering wheel 303 over its entire circumference. The distal ends 311 of the fiberscopes poke out at holes that are perpendicular to the wheel. In other words, distal ends 311 of the fiberscopes emerge to a surface of the steering wheel 303 through holes that are perpendicular to an axis of rotation of the steering wheel 303. The lenses at the distal ends 311 may have a convex curvature so as to form slight bumps on the wheel. The lenses at the distal ends may be microlenses 311. Each microlens 311 is associated with a fiber bundle 313. Fiber bundles 313 for each fiberscope are routed in a hollow tube of the steering wheel 303. Each fiberscope may be connected to a dedicated video camera 315 that is located remotely from the steering wheel 303, such as inside the steering column 320. Other camera configurations are possible.

Figure 4B:
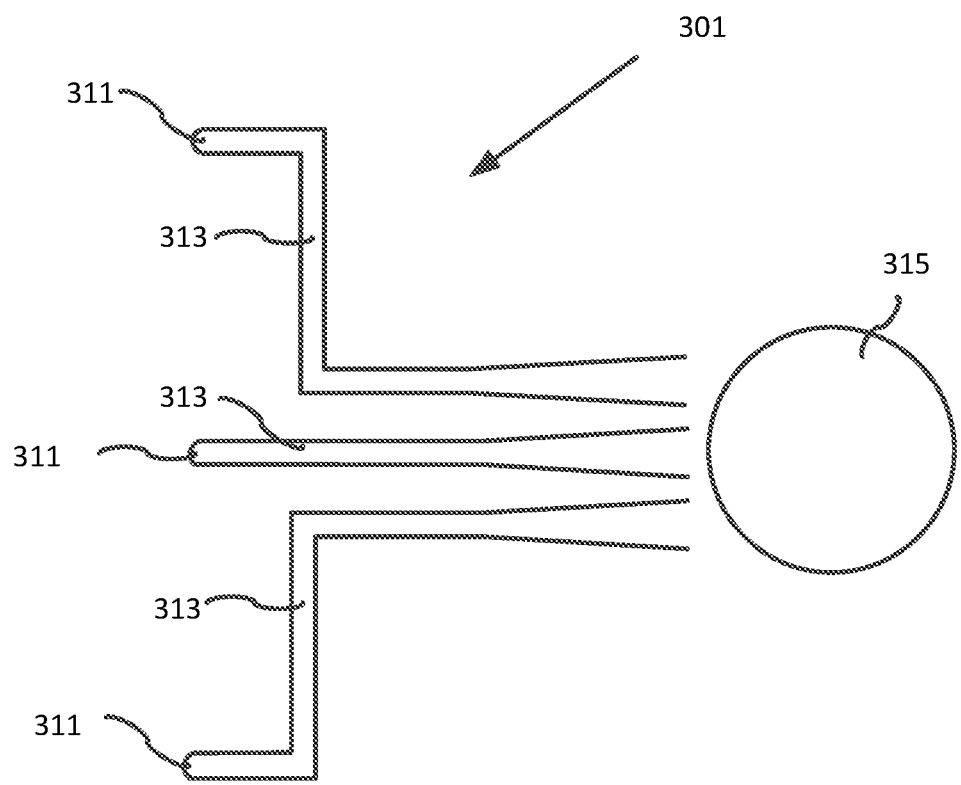

As in FIG. 4B, multiple fiberscopes may be connected to a common video camera 315. Although FIG. 4B shows three fiberscopes connected to one video camera 315, various numbers of fiberscopes may be connected to a camera lens 315. It is preferred that fiberscopes be evenly distributed around the connection to the camera. In addition, fiberscopes for a steering wheel may be grouped and connected to several video cameras 315. For example, there may be three video cameras 315 for a steering wheel, each video camera 315 being connected to five fiberscopes. In arrangements having multiple video cameras, subsets of fiberscopes that are being operated to receive images will send image portions to respective video cameras 315. For example, if three fiberscopes are connected to one video camera 315, when all three fiberscopes are activated, image portions from the three fiberscopes will be captured by the one video camera 315. If two of three fiberscopes are activated, image portions from the two fiberscopes will be captured by the video camera 315. A second video camera may capture an image portion from a single fiberscope, and the image portions captured by the first and second video cameras may be synthesized into one image using the image synthesis function 127.

Fiberscopes typically include their own light source emitted through an optical fiber of the fiber bundle. However, as noted above, a driver's face may be occluded when the driver turns their head a certain way that is not facing a camera 111 of the driver monitoring system 100. Using photometric stereo, two or more images taken from the same viewpoint, with different lighting, can be used to determine face surface orientation.

FIG. 5 illustrates sensor and displays for an interior of a vehicle in accordance with an exemplary aspect of the disclosure. In addition to an instrument panel 515, which may include at least a speedometer 525 to measure and display a speed of a vehicle, a vehicle 100 may include a navigation, or infotainment, interactive display 513. The interior cabin of the vehicle may include one or more in-cabin cameras 111. In-cabin cameras 111 may be mounted on a vehicle dashboard 510, along the ceiling, embedded in the dashboard, in the rear-view mirror, or on the steering column 320. Light sources 113 may be included as part of the in-cabin cameras 111, positioned adjacent to in-cabin cameras 111, or in other positions in the cabin, such as below the ceiling or on the rear-view mirror. A digital instrument panel 515 may be included above the navigation display 513 in a vicinity of the center of the dashboard 510, or behind the steering wheel 303 above the steering column 320.

Figure 6:
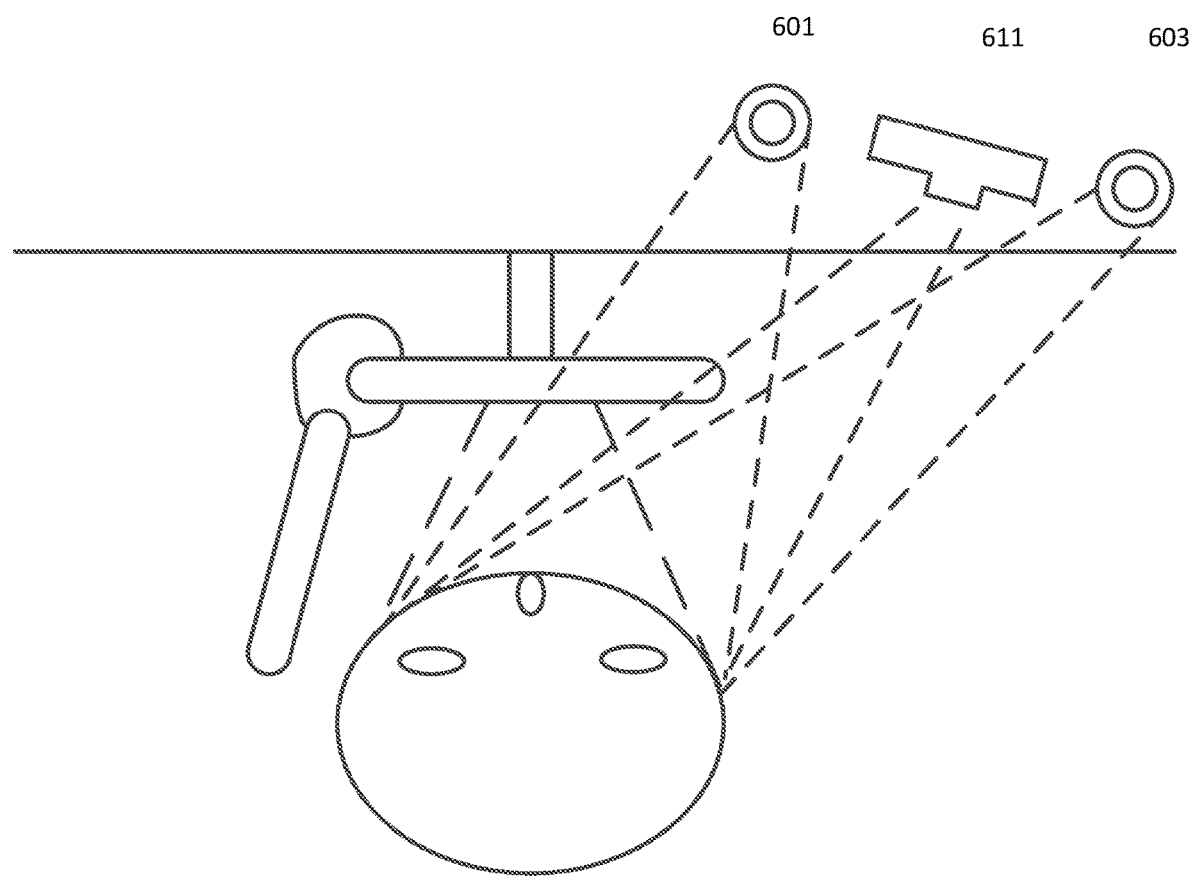
FIG. 6 is a schematic of a top view of the cabin interior showing components of the driver monitoring system in accordance with an exemplary aspect of the disclosure.
Figure 7:
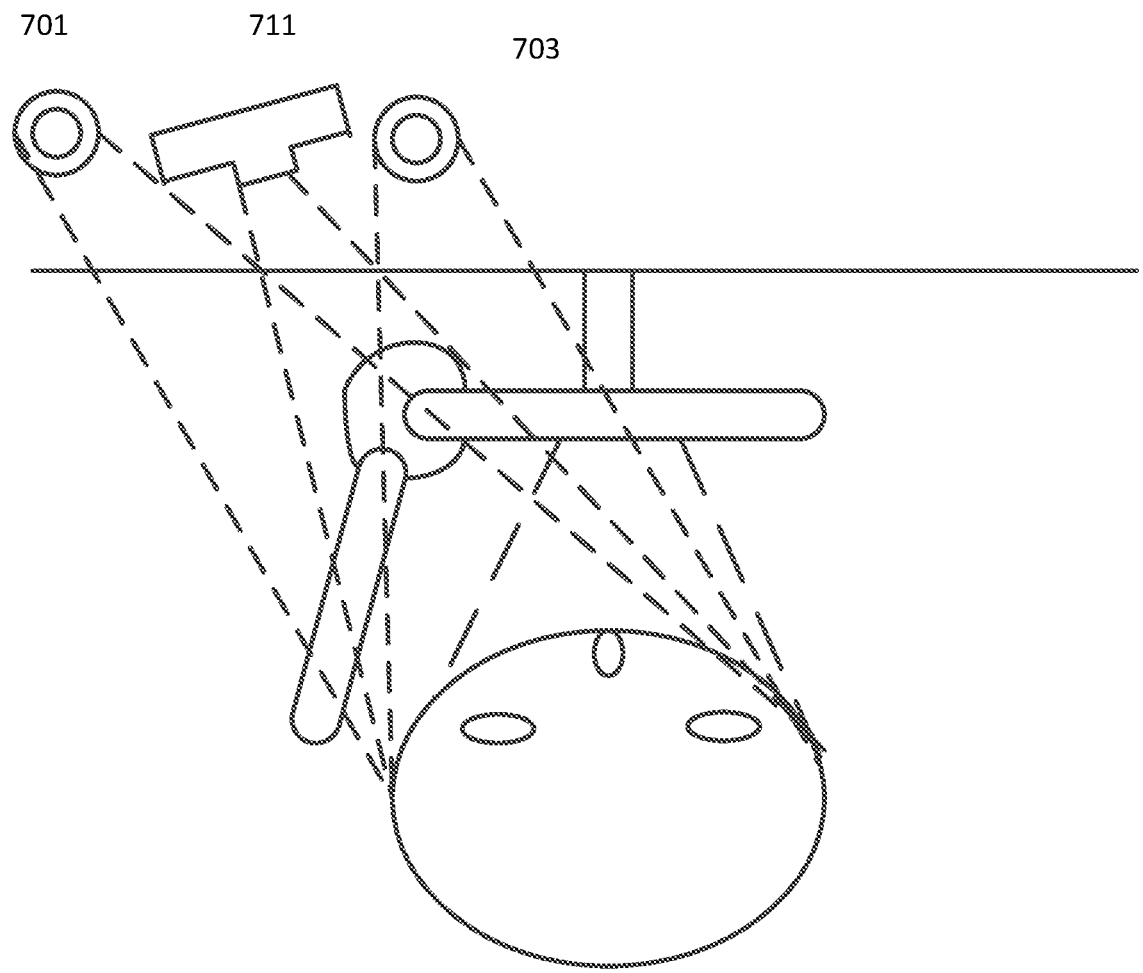
FIG. 7 is a schematic of an alternative top view of the cabin interior showing components of the driver monitoring system in accordance with an exemplary aspect of the disclosure.

FIG. 6 is a schematic of a top view of the cabin interior showing operating components of the driver condition detection system on one side of a driver in accordance with an exemplary aspect of the disclosure. FIG. 7 is a schematic of a top view of the cabin interior showing operating components of the driver monitoring system on another side in accordance with an exemplary aspect of the disclosure.

In-cabin driver monitor cameras 611, 711 may be mounted on the dashboard 510 or below the ceiling of the interior cabin in conjunction with fiberscopes in the steering wheel. The in-cabin driver monitor cameras 611, 711 may have associated light sources 601, 603, 701, 703. The in-cabin driver monitor cameras 611, 711 and light sources 601, 603, 701, 703 may be used to obtain images of the driver's face when it is facing outside the focus direction of the fiberscopes in the steering wheel, or may be used in conjunction with images obtained using the fiberscopes. Also, in-cabin driver monitor cameras 611, 711 may be turned on when the ECU 120 determines that operating fiberscopes in the steering wheel 303 are blocked, for example by the driver's finger or hand. Blockage may be detected when an image from a camera, or some portion of an image from a fiberscope is substantially black, or dark such that the image is indiscernible.

Figure 8:
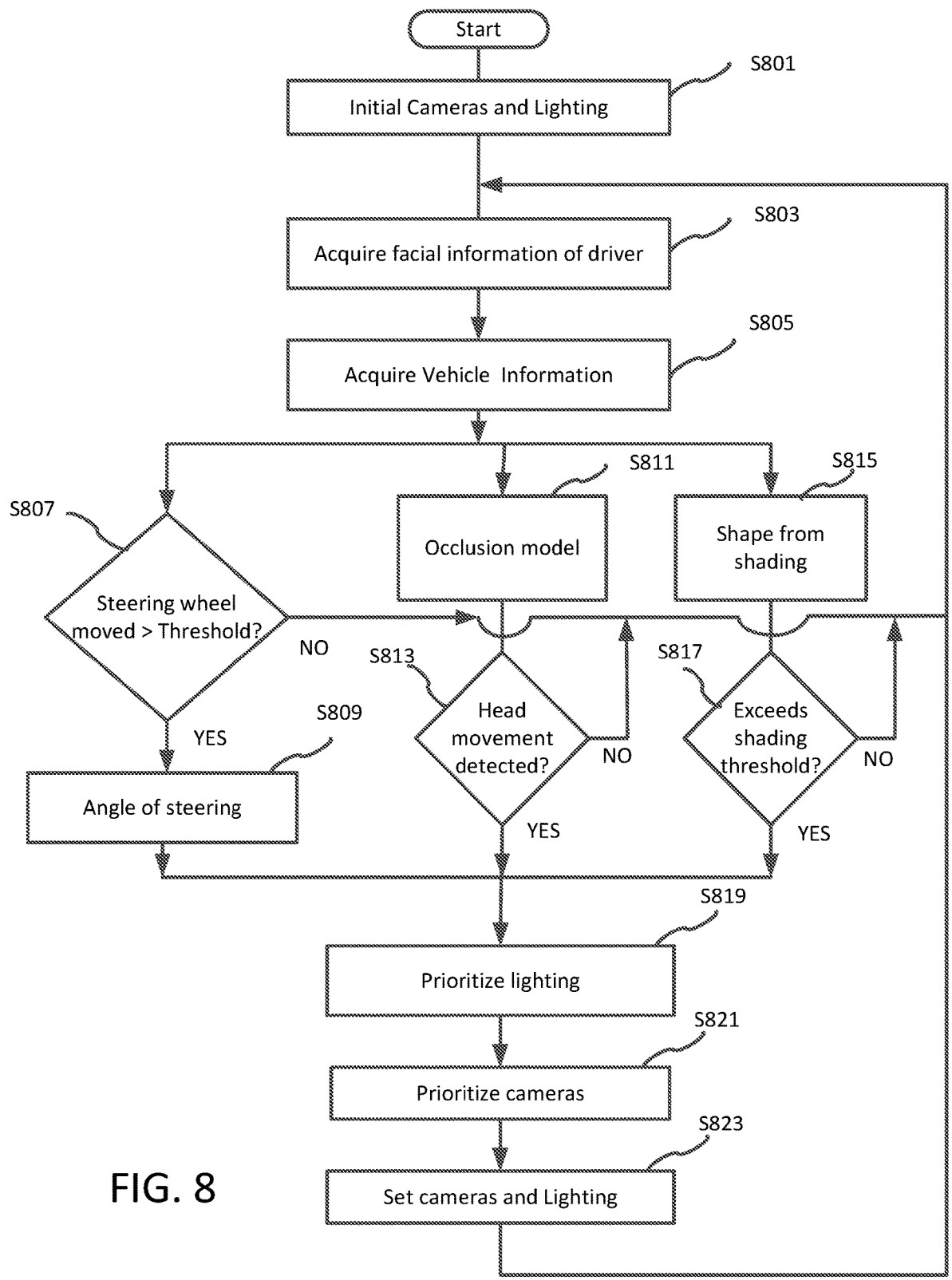
FIG. 8 is a flowchart of control of cameras and lighting for the driver monitoring system in accordance with an exemplary aspect of the disclosure.

FIG. 8 is a flowchart of control of cameras and lighting for the driver monitoring system in accordance with an exemplary aspect of the disclosure. When a driver enters a vehicle and sits in the driver's seat, in S801, the ECU 120 may turn on initial driver monitor cameras 111 and light sources 113. In some embodiments, initial driver monitor cameras 111 and light sources 113 may be turned on when the engine is started. In some embodiments, all driver monitor cameras 111 and light sources 113 may be turned on. In some embodiments, certain driver monitor cameras 111 and light sources 113 may be turned on. In a preferred embodiment, the driver monitor cameras 111 and light sources 113 that are initially turned on are cameras and light sources 301a for five fiberscopes located at the top of the steering wheel 303.

In S803, the initial driver monitor cameras 111 and light sources 113 are used to acquire facial information of a driver. The driver's face may not be facing forward or may not be facing toward the initial driver monitor cameras 111.

In S805, other sensors may be used to acquire vehicle information. Vehicle information may include an indication of movement of the steering wheel and vehicle speed.

In S807, the ECU 120 may detect movement of the steering wheel greater than a threshold value. The threshold may be an angle of the steering wheel from a neutral position, or may be an angle of movement. For example, the ECU 120 may detect movement of the steering wheel to a new angle for a predetermined period of time, such as a few seconds. The ECU 120 may detect movement of the steering wheel between positions that exceed an angle of movement for a predetermined period of time. The angle of movement may be, for example, about 5 degrees or 10 degrees. The angle of movement may be an angle that would cause one fiberscope to go out of focus and cause one other fiberscope to come into focus. In S809, the angle of the steering wheel may be determined.

In S811, the occlusion model function 121 may include a face recognition component that can determine that a driver's face is not facing a driver monitor camera(s), and may identify the direction that the driver's head is facing. The occlusion model function 121 may take as input one or more images captured using fiberscopes arranged on the steering wheel 303. The occlusion model function 121 may detect that a driver's head is moved to a position that is not facing a forward facing direction. In some embodiments, the occlusion model function 121 may detect a three-dimensional position of the driver's face, which includes head tilt as well as head rotation.

The occlusion model function 121 may further predict the driver's face orientation based on historical head movement and acquired vehicle information such as the trajectory of the vehicle and a trajectory path as obtained from a navigation function of the vehicle. In S813, the ECU 120 may detect head movement or predict head movement. The occlusion model function 121 may perform a prediction of head movement using historical head movement in regression analysis.

In S815, shape from shading 123 is configured to detect the effect of lighting. In S817, the amount of shading in an image may be compared to a shading threshold. For example, a brightness of an image may be compared to the shading threshold to determine if the amount of brightness is too low.

In S819, results of steering wheel movement, detection or prediction of head movement using the occlusion model function 121, and the amount of shading in an image using shape from shading 123, the ECU 120 may prioritize which light sources 113 are turned on or off. The turning on and off of light sources is a dynamic process that can take place as the steering wheel is being turned, or as the position of a driver's head changes. The degree of changes in lighting may be controlled based on time and motion thresholds in order to prevent changes in lighting from becoming a distraction or from occurring too rapidly. The ECU 120 may prioritize the light sources 113 based on the position of the driver's head detected by the occlusion model function 121. The ECU 120 may prioritize the light sources 113 based on the amount of shading in an image of the driver's face. In S821, the ECU 120 may prioritize which cameras 111 are turned on or off. Upon determining the change in angle of the steering wheel 303 beyond a predetermined angle, the video cameras that are associated with fiberscopes positioned at a top of the steering wheel 303 are turned on, while the other video cameras associated with fiberscopes at sides and bottom of the steering wheel 303 are turned off.

In addition to the fiberscopes in the steering wheel 303, the in-cabin video cameras 611, 711 and associated in-cabin light sources 601, 603, 701, 703 may be controlled to turn on or off. The occlusion model function 121 may detect movement of a driver's head beyond a predetermined angle from the front facing direction. One or more of the in-cabin video cameras 611, 711 and associated light sources 601, 603, 701, 703 are turned on based on the detected movement of the driver's head beyond the predetermined angle. The in-cabin light sources 601, 603, 701, 703 may be arranged on either side of the steering wheel 303 on a surface of a frame 510 of the cabin, such as the vehicle dash or cabin ceiling. The ECU 120 may turn on selected ones of the in-cabin light sources 601, 603, 701, 703 based on the amount of shading in an image(s) of the driver's face.

In some embodiments, in S823, the cameras and lighting may be set based on the prioritized light sources 113 and prioritized cameras 111.

Once driver monitor cameras 111 and light sources 113 are set, in S803, facial information of a driver is again acquired, and the steps leading to prioritizing lighting and prioritizing cameras are repeated.

Numerous modifications and variations of the present invention are possible in light of the above teachings. It is therefore to be understood that within the scope of the appended claims, the invention may be practiced otherwise than as specifically described herein.

The invention claimed is:

1. A control system for preventing occlusion of and minimizing shadows on a driver's face for driver monitoring,
the system comprising:
a vehicle dashboard;
a plurality of in-cabin cameras mounted horizontally across the vehicle dashboard;
a plurality of light sources positioned adjacent to the in-cabin cameras; and
an electronic control unit connected to the plurality of in-cabin cameras and the plurality of light sources to turn on selected ones of the plurality of the in-cabin cameras and ones of the plurality of light sources based on an amount of shading in an image of the driver's face.

2. The control system of claim 1, wherein the electronic control unit includes an occlusion model function configured to detect that a driver's head is moved to a position that is not facing a forward facing direction.

3. The control system of claim 1, wherein the electronic control unit includes a shading function configured to determine an amount of shading in an image of a driver's face.

4. The control system of claim 2, wherein the electronic control unit prioritizes the light sources based on the position of the driver's head detected by the occlusion model function.

5. The control system of claim 3, wherein the electronic control unit prioritizes the light sources based on the amount of shading in an image of the driver's face.

6. The control system of claim 2, further comprising a plurality of in-cabin video cameras and associated in-cabin light sources,
wherein the occlusion model function is further configured to detect movement of a driver's head beyond a predetermined angle from a front facing direction, and
wherein one or more of the plurality of in-cabin video cameras and associated light sources are turned on based on the detected movement of the driver's head beyond the predetermined angle.

7. The control system of claim 3, further comprising a plurality of in-cabin light sources arranged on either side of a steering wheel on a surface of a frame of the cabin,
wherein the electronic control unit turns on selected ones of the in-cabin light sources on either side of the steering wheel based on the amount of shading in an image of the driver's face.

8. A method of preventing occlusion of and minimizing shadows on a driver's face for driver monitoring in a driver monitoring system, the driver monitoring system includes a vehicle dashboard, a plurality of in-cabin cameras mounted to the vehicle dashboard, a plurality of light sources positioned adjacent to the in-cabin cameras, and an electronic control unit (ECU) connected to the plurality of in-cabin cameras and the plurality of light sources, the method comprising:
upon detecting movement of a drivers head beyond a predetermined angle, the electronic control unit turning on one or more of the plurality of in-cabin cameras, while turning off others of the plurality of in-cabin cameras, and turning on selected ones of the plurality of light sources based on an amount of shading in an image of the driver's face.

9. The method of claim 8, further comprising:

detecting, by the electronic control unit, that a driver's head is moved to a position that is not facing a forward facing direction.

10. The method of claim 8, further comprising:

determining, by the electronic control unit, an amount of shading in an image of a driver's face.

11. The method of claim 9, further comprising:

prioritizing, by the electronic control unit, the light sources based on the position of the driver's head.

12. The method of claim 10, further comprising:

prioritizing, by the electronic control unit, the light sources based on the amount of shading in an image of the driver's face.

13. The method of claim 9, further including a plurality of in-cabin video cameras and associated in-cabin light sources, the method further comprising detecting, by the electronic control unit, movement of a driver's head beyond a predetermined angle from the forward facing direction, wherein one or more of the plurality of in-cabin video cameras and associated light sources are turned on based on the detected movement of the driver's head beyond the predetermined angle.

14. The method of claim 10, further including a plurality of in-cabin light sources arranged on either side of a steering wheel on a surface of a frame of the cabin, the method further comprising:

turning on, by the electronic control unit, selected ones of the in-cabin light sources on either side of the steering wheel based on the amount of shading in an image of the driver's face.

15. A non-transitory computer readable storage medium storing program instructions, which when executed by a computer perform a method of preventing occlusion of and minimizing shadows on a driver's face for driver monitoring comprising:

upon detecting movement of the driver's head beyond a predetermined angle, turning on one or more in-cabin cameras, while turning off others of in-cabin cameras, and turning on selected ones of a plurality of in-cabin light sources based on an amount of shading in an image of the driver's face.

* * * * *